(12) United States Patent  
Guen

(10) Patent No.: US 9,412,991 B2  
(45) Date of Patent: Aug. 9, 2016

(54) SECONDARY BATTERY

(71) Applicant: SAMSUNG SDI CO., LTD., Yongin-si, Gyeonggi-do (KR)

(72) Inventor: Minhyung Guen, Yongin-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 50 days.

(21) Appl. No.: 14/300,444

(22) Filed: Jun. 10, 2014

(65) Prior Publication Data

US 2015/0221920 A1 Aug. 6, 2015

(30) Foreign Application Priority Data

Jan. 27, 2014 (KR) .................. 10-2014-0009784

(51) Int. Cl.
*H01M 2/26* (2006.01)
*H01M 10/04* (2006.01)
*H01M 10/052* (2010.01)

(52) U.S. Cl.
CPC .......... *H01M 2/263* (2013.01); *H01M 10/0413* (2013.01); *H01M 10/0422* (2013.01); *H01M 10/0431* (2013.01); *H01M 10/052* (2013.01); *H01M 2220/20* (2013.01)

(58) Field of Classification Search
None
See application file for complete search history.

(56) References Cited

U.S. PATENT DOCUMENTS

| | | | |
|---|---|---|---|
| 6,184,558 B1 * | 2/2001 | Kitamura | H01L 21/823807 257/392 |
| 2009/0130554 A1 * | 5/2009 | Jang | H01M 2/0215 429/179 |
| 2010/0209750 A1 * | 8/2010 | Nagamatsu | H01M 2/0262 429/94 |
| 2011/0165366 A1 * | 7/2011 | Wang | B29C 45/14311 428/68 |
| 2011/0250491 A1 | 10/2011 | Kim et al. | |
| 2012/0135283 A1 | 5/2012 | Lee | |
| 2013/0040178 A1 * | 2/2013 | Lim | H01M 2/0242 429/94 |
| 2013/0149598 A1 | 6/2013 | Kim et al. | |

FOREIGN PATENT DOCUMENTS

| | | |
|---|---|---|
| KR | 10-2011-0114411 A | 10/2011 |
| KR | 10-1147174 B1 | 5/2012 |
| KR | 10-2013-0065574 A | 6/2013 |

* cited by examiner

*Primary Examiner* — Patrick Ryan
*Assistant Examiner* — Wyatt McConnell
(74) *Attorney, Agent, or Firm* — Lee & Morse, P.C.

(57) ABSTRACT

A secondary battery includes an electrode assembly having an electrode uncoated portion, a current collector having a pair of collecting parts coupled to the electrode uncoated portion, a case accommodating the electrode assembly, and a cap plate sealing an opening of the case. Each of the collecting parts includes a first surface facing an inner wall of the case. A retainer part extends toward the inner wall of the case from the first surface of each of the collecting parts. The retainer part is moldingly integrated with each of the collecting parts.

18 Claims, 6 Drawing Sheets

SECONDARY BATTERY

CROSS-REFERENCE TO RELATED APPLICATION

Korean Patent Application No. 10-2014-0009784, filed on Jan. 27, 2014, in the Korean Intellectual Property Office, and entitled: "Secondary Battery," is incorporated by reference herein in its entirety.

BACKGROUND

1. Field of the Invention

Embodiments relate to a secondary battery.

2. Description of the Related Art

Secondary batteries are rechargeable, unlike primary batteries. Among such secondary batteries, a low capacity battery including a battery cell in the form of a battery pack may be used for small portable electronic devices such as cellular phones and camcorders, and a high capacity battery including dozens of battery cells connected to one another may be used as a motor-driving power source for electric scooters, hybrid vehicles, or electric vehicles.

Secondary batteries are manufactured in various shapes such as a cylindrical shape and a prismatic shape. A secondary battery may be constructed as follows: an electrode assembly formed by disposing an insulating separator between a positive electrode plate and a negative electrode plate is placed in a case together with electrolyte, and a cap plate is disposed on the case. The electrode assembly may be connected to electrode terminals which protrude from the cap plate and are exposed to the exterior of the secondary battery.

SUMMARY

Embodiments are directed to a secondary battery including an electrode assembly having an electrode uncoated portion, a current collector having a pair of collecting parts coupled to the electrode uncoated portion, a case accommodating the electrode assembly, and a cap plate sealing an opening of the case. Each of the collecting parts includes a first surface facing an inner wall of the case. A retainer part extends toward the inner wall of the case from the first surface of each of the collecting parts. The retainer part is moldingly integrated with each of the collecting parts.

The retainer part may have a shape of a planar plate.

The retainer part may be in a space between the first surface of the collecting part and the inner wall of the case.

The retainer part may have a width corresponding to the space between the first surface of the collecting part and the inner wall of the case.

One end of the retainer part may be connected to the first surface of the collecting part. An other end of the retainer part may contact the inner wall of the case.

An additional retainer part may be further formed on a second surface on an opposite side of the collecting part from the first surface, the additional retainer part extending from the second surface in a direction away from the collecting part.

The additional retainer part may be moldingly integrated with the collecting part.

The retainer part may include at least one material selected from the group of a polyethylene (PE) resin, a polypropylene (PP) resin, a polystyrene (PS) resin, and an acrylonitrile butadiene styrene (ABS) resin.

The first surface of the collecting part may include a protrusion protruding toward the inner wall of the case.

The first surface of the collecting part may have a larger area than a cross section of the protrusion parallel to the first surface.

The protrusion may have a shape, in a cross-section perpendicular to the first surface, selected from a circle, a semicircle, and a polygon.

The retainer part may cover the first surface of the collecting part and an outer surface of the protrusion.

BRIEF DESCRIPTION OF THE DRAWINGS

Features will become apparent to those of skill in the art by describing in detail exemplary embodiments with reference to the attached drawings in which.

The aspects, features, and advantages will be more apparent from the following detailed description in conjunction with the accompanying drawings, in which.

DETAILED DESCRIPTION

Figure 1:
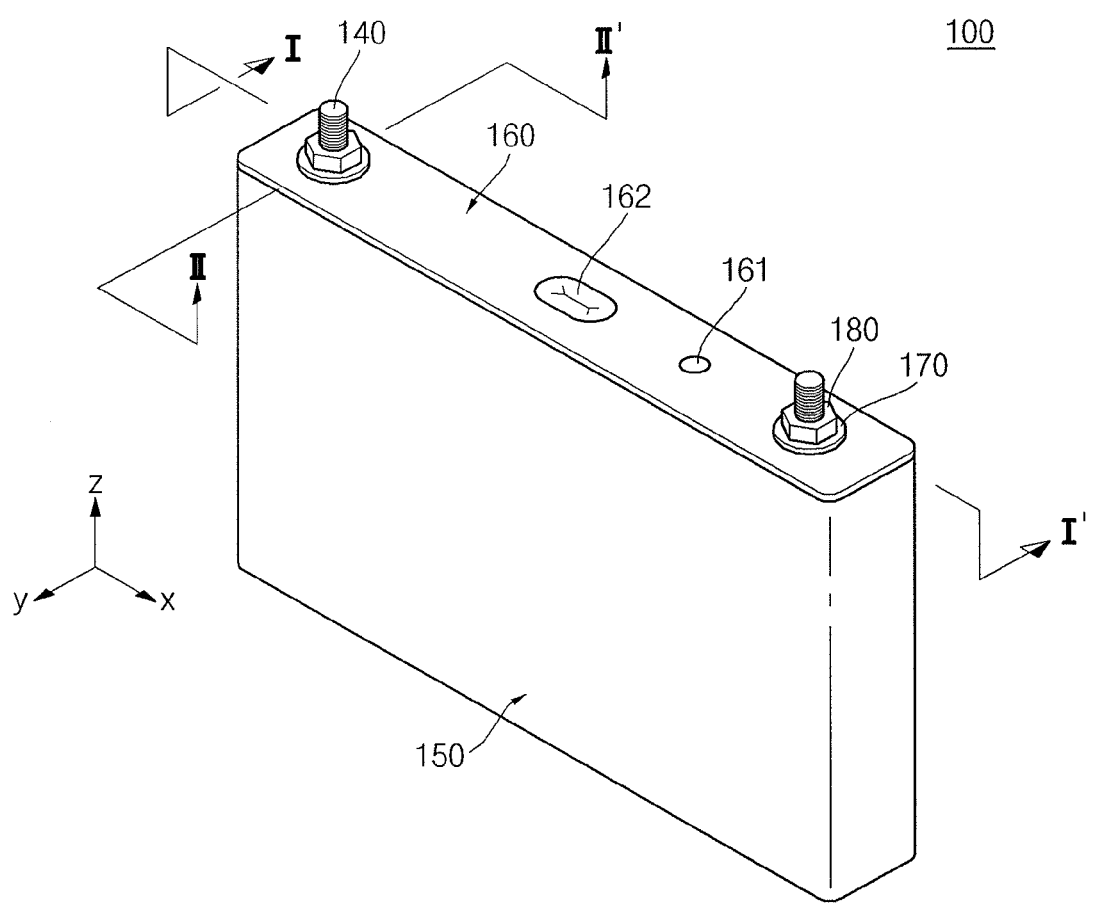
FIG. 1 illustrates a perspective view depicting a secondary battery according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. Like reference numerals refer to like elements throughout.

Hereinafter, a configuration of a secondary battery according to an embodiment will be described.

Figure 2:
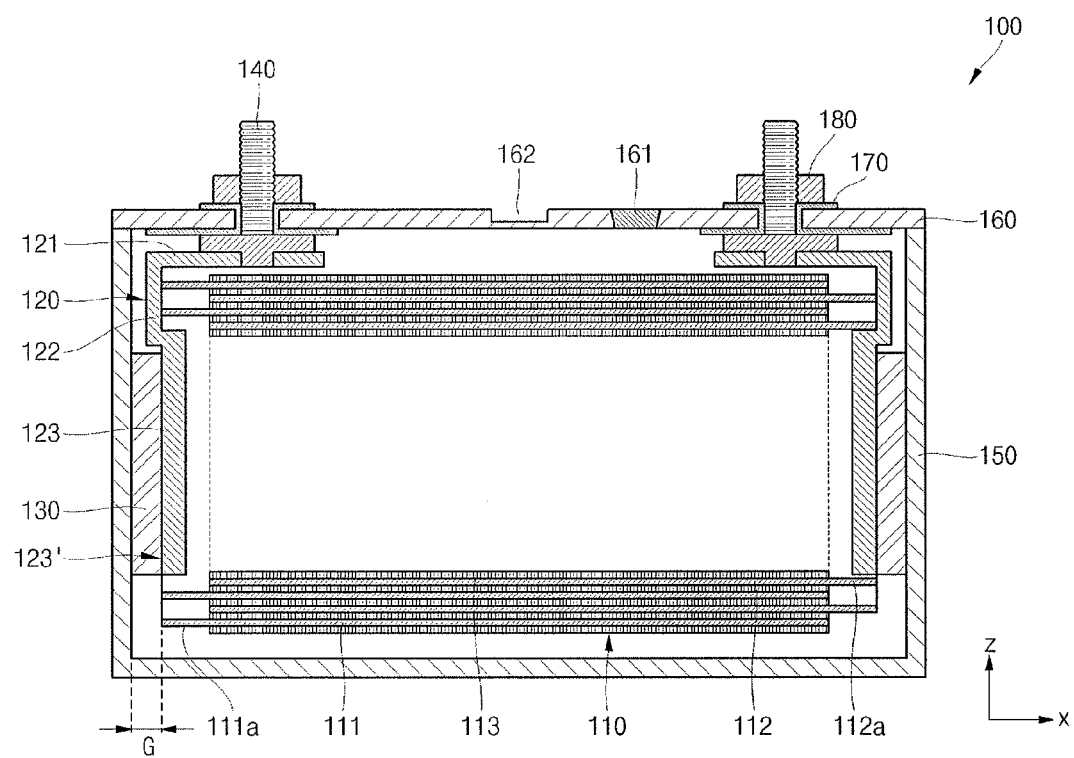
FIG. 2 illustrates a sectional view taken along the line I-I' of FIG. 1.
Figure 3:
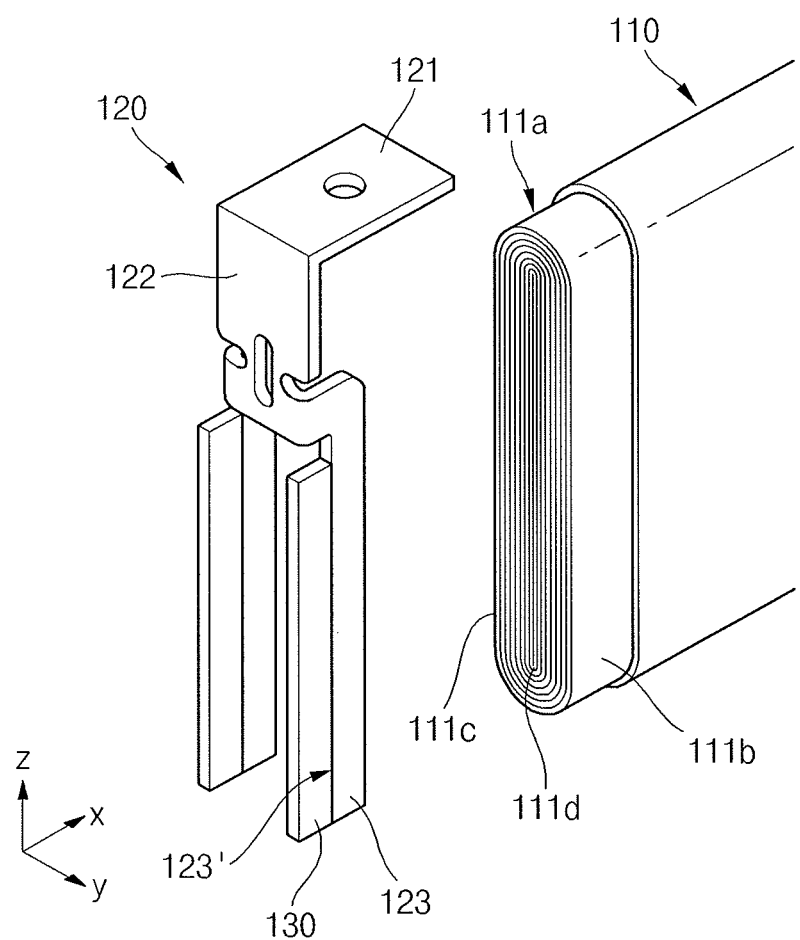
FIG. 3 illustrates an exploded perspective view depicting an electrode assembly and a current collector according to an embodiment.
Figure 4:
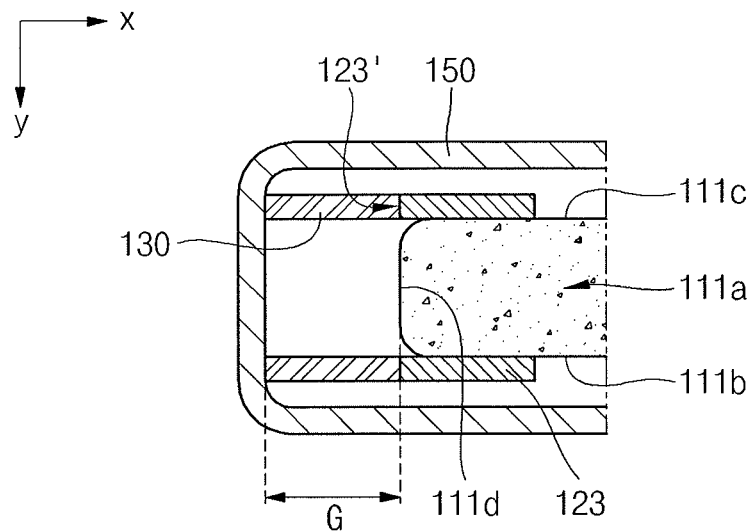
FIG. 4 illustrates a partially sectional view taken along the line II-II' of FIG. 1.
Figure 5:
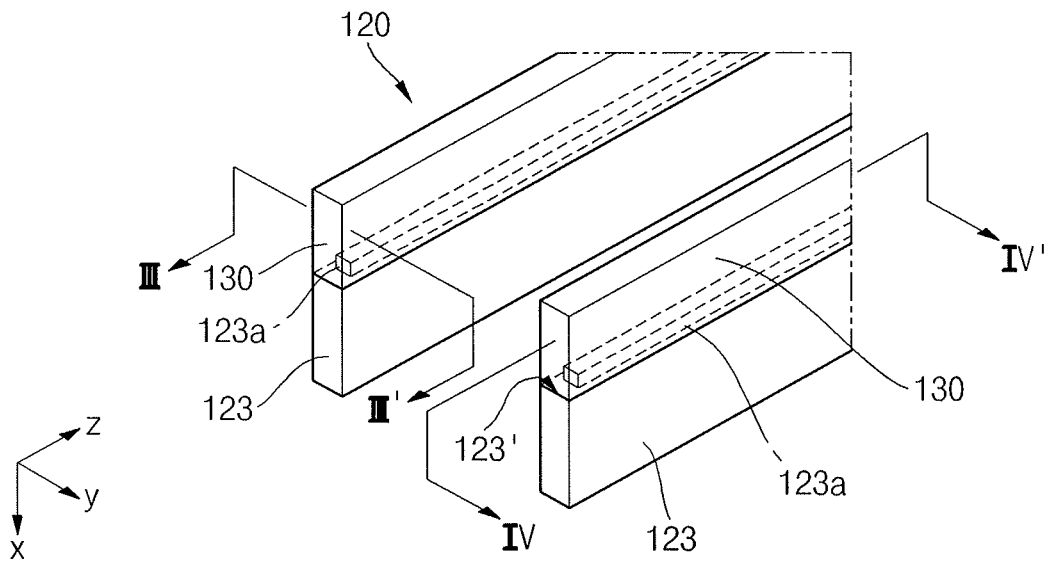
FIG. 5 illustrates a perspective view depicting a bottom portion of a current collector according to an embodiment.
Figure 6:
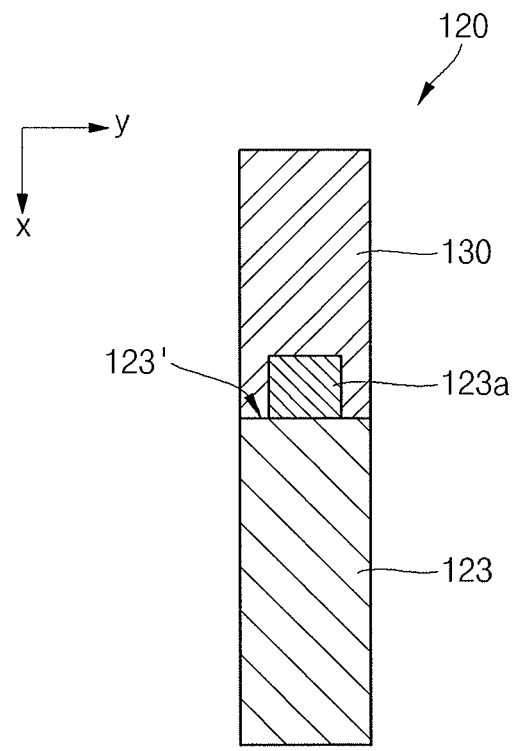
FIG. 6 illustrates a partially sectional view taken along the line III-III' of FIG. 5.
Figure 7:
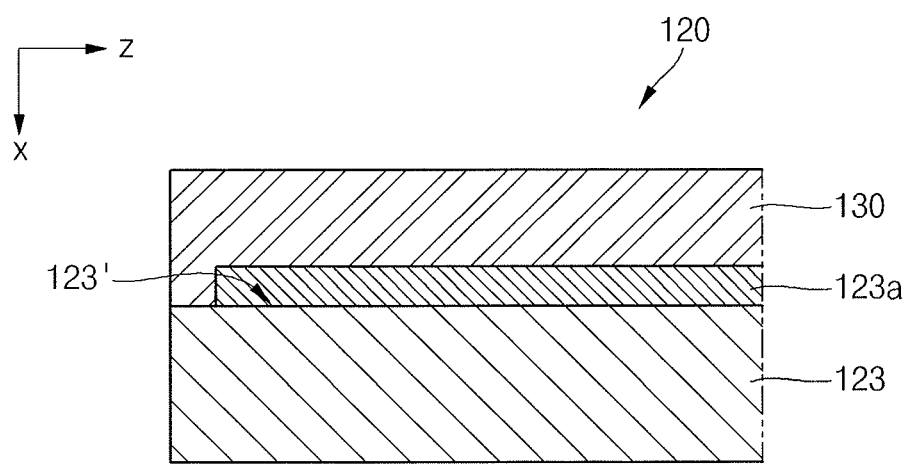
FIG. 7 illustrates a partially sectional view taken along the line IV-IV' of FIG. 5.

FIG. 1 illustrates a perspective view depicting a secondary battery according to an embodiment, FIG. 2 illustrates a sectional view taken along the line I-I' of FIG. 1, FIG. 3 illustrates an exploded perspective view depicting an electrode assembly and a current collector according to an embodiment, FIG. 4 illustrates a partially sectional view taken along the line II-II' of FIG. 1, FIG. 5 illustrates a perspective view illustrating a bottom portion of a current collector according to an embodiment, FIG. 6 illustrates a partially sectional view taken along the line III-III' of FIG. 5, and FIG. 7 illustrates a partially sectional view taken along the line IV-IV' of FIG. 5.

Referring to FIGS. 1 to 7, the secondary battery 100 according to an embodiment may include an electrode assembly 110, a current collector 120 electrically connected to the electrode assembly 110, a retainer 130 molded to and integrally formed with the current collector 120, an electrode terminal 140 connected to the current collector 120, a case 150 accommodating the electrode assembly 110, and a cap plate 160 sealing the case 150.

The electrode assembly 110 may be formed by winding or stacking a stacked structure of a first electrode plate 111, a separator 113, and a second electrode plate 112, which may be formed of a thin plate or layer. The electrode assembly 110 may have a wound structure in a substantially jelly-roll type configuration.

The first electrode plate 111 may serve as a negative electrode and the second electrode plate 112 may serve as a positive electrode, or vice versa.

The first electrode plate 111 may be formed by coating a first electrode active material, such as graphite or carbon, on a first electrode collector formed of a metal foil made of, for example, nickel or copper. The first electrode plate 111 may include a first electrode uncoated portion 111a where the first electrode active material is not applied. The first electrode uncoated portion 111a may function as a passage for current flowing between the first electrode plate 111 and an exterior of the first electrode plate 111.

The second electrode plate 112 may be formed by coating a second electrode active material, such as a transition metal, on a second electrode collector formed of a metal foil made of, for example, aluminum. The second electrode plate 112 may include a second electrode uncoated portion 112a where the second electrode active material is not applied at the other end opposite to the one end having the first electrode uncoated portion 111a. The second electrode uncoated portion 112a may function as a passage for current flowing between the second electrode plate 112 and an exterior of the second electrode plate 112.

The separator 113 may be positioned between the first electrode plate 111 and the second electrode plate 112 to prevent electrical short circuits and to allow movement of lithium ions. The separator 113 may be made of a material selected from the group of polyethylene, polypropylene, or a copolymer of polypropylene and polyethylene, as examples.

The electrode assembly 110 and an electrolyte may be accommodated in the case 150. The electrolyte may include an organic solvent, such as ethylene carbonate (EC), propylene carbonate (PC), diethyl carbonate (DEC), ethyl methyl carbonate (EMC), or dimethyl carbonate (DMC) and a lithium salt, such as $LiPF_6$, or $LiBF_4$. The electrolyte may be in a liquid, solid or gel phase.

The electrode assembly 110 may include coated portions that are coated with active materials and first and second electrode uncoated portions 111a and 112a that are not coated with active materials and are positioned at opposite ends of the coated portions.

First and second current collectors 120 (to be collectively referred to as a current collector) may be connected to the first and second electrode uncoated portions 111a and 112a. For example, a pair of current collectors 120 may be provided to be connected to the first and second electrode uncoated portions 111a and 112a of the electrode assembly 110. The current collector 120 may be connected to the electrode assembly 120 through the first and second electrode uncoated portions 111a and 112a and may form input/output paths of electrical signals between the current collectors 120 and the outside through the electrode terminal 140 connected to the current collector 120.

The current collector 120 may include a plate part 121 that is parallel to a horizontal direction (x-axis direction) of the electrode assembly 110, a body part 122 bent from the plate part 121 in a substantially vertical direction (z-axis direction), and a pair of collecting parts 123 extending from one and the other sides of the body part 122 to be welded to front and rear surfaces 111b and 111c of the first electrode uncoated portion 111a. In addition, a retainer part 130 extending from the collecting part 123 to the case 150 may be formed on the collecting part 123 so as to contact the case 150. The retainer part 130 may be integrally formed with the collecting part 123 by molding. The current collector 120 connected to the second electrode uncoated portion 112a may have the same configuration as the current collector 120 connected to the first electrode uncoated portion 111a, and descriptions thereof will not be repeated.

The plate part 121 may have a substantially planar plate and may be horizontally formed on the electrode assembly 110 along a portion of the length of the electrode assembly 110. One side of the plate part 131 may be connected to the electrode terminal 140 and the other side of the plate part 131 may be connected to the body part 122. A terminal hole may be formed at one side of the plate part 121, such that the electrode terminal 140 may pass through the terminal hole and the cap plate 160 and then protrude and extend a predetermined length.

The body part 122 may be vertically bent from the other side of the plate part 131 to extend to be parallel with edges of the electrode assembly 110. The body part 122 may face an end 111d of the first electrode uncoated portion 111a and may be positioned between the end 111d and a sidewall of the case 150.

The collecting part 123 may extend in a direction parallel to the first electrode uncoated portion 111a (that is, the z-axis direction) from one and the other sides of the body part 122. The collecting parts 123 may be provided as a pair to extend to be parallel with each other while making contact with the front and rear surfaces 111b and 111c of the first electrode uncoated portion 111a. The pair of collecting parts 123 may be directly fixed to contact considerable areas of the front and rear surfaces 111b and 111c of the first electrode uncoated portion 111a.

The retainer part 130 may be molded to the collecting part 123 so as to be integrally formed with the collecting part 123. In addition, the retainer part 130 may be made of material having an electrically insulating property, such as a polyethylene (PE) resin, a polypropylene (PP) resin, a polystyrene (PS) resin, or an acrylonitrile butadiene styrene (ABS) resin. The retainer part 130 may be shaped as a planar plate extending from a first surface 123' of each of the pair of collecting parts 123 toward the case 150 (in the x-axis direction). The first surface 123' may be a surface of the collecting part 123 facing an inner surface of the case 150. The retainer part 130 may be provided as a pair of retainer parts, each extending from one of the pair of collecting parts 123. The retainer part 130 may be formed in a gap G corresponding to a space between the first surface 123' of the collecting part 123 and the case 150. For example, the retainer part 130 may be between the end 111d of the first electrode uncoated portion 111a and the inner wall of the case 150 so as to have a width corresponding to the gap G. The retainer part 130 may be formed to have a width equal to the gap G and may have one end connected to the collecting part 123 welded to the first electrode uncoated portion 111a and the other end contacting the inner wall of the case 150. A position of the electrode assembly 110 may be fixed within the case 150 by the pair of retainer parts 130. The retainer part 130 may prevent the electrode assembly 110 from moving within the case 150, thereby improving the durability of the electrode assembly 110 against vibration. The first and second electrode uncoated portions 111a and 112a and the case 150 or the current collector 120 and the case 150 may be maintained at an electrically insulated state.

Referring to FIGS. 5 to 7, the collecting part 123 may further include a protrusion 123a on the first surface 123'. A cross section (e.g., in a yz plane) of the protrusion 123a may have a smaller area than the first surface 123' and may protrude a predetermined length toward the inner surface of the case 150 (in the x-axis direction). In the illustrated embodiment, a cross section (e.g., in an xy plane) of the protrusion 123a may be rectangular. In other implementations, the cross section of the protrusion 123a may have a shape selected from a circle, a semi-circle, and a polygon.

The retainer part 130 may be formed to surround the first surface 123' of the collecting part 123 and the entire outer surface of the protrusion 123a. The protrusion 123a may facilitate molding of the collecting part 123 and the retainer part 130. The collecting part 123 and the retainer part 130 may be more firmly coupled to each other by the protrusion 123a. The retainer part 130 may be integrally formed with the collecting part 123 by molding, and automatic production may be enabled without manual assembling work, thereby increasing productivity. The retainer part 130 having a relatively small width may be formed in the current collector 120. Accordingly space-saving and weight-reducing effects may be obtained. The capacity of the secondary battery 100 may be increased by increasing the width of the electrode assembly 110. In other implementations, the secondary battery 100 may be miniaturized by reducing the width of the case 150 while maintaining the width of the electrode assembly 110.

The electrode terminal 140 may be formed using a metal or an equivalent thereof and may include first and second electrode terminals electrically connected to the first and second electrode plates 111 and 112. The electrode terminal 140 may be coupled to the terminal hole of the plate part 121 and may protrude from the plate part 121 in a vertical direction (in the z-axis direction). The electrode terminal 140 may further protrude from an upper portion of the cap plate 160. The electrode terminal 140 may include a screw thread to then be engaged with a nut 180 fastened thereon.

The case 150 may have an approximately hexahedral shape with an internal receiving space and a top opening. The case 150 may include two wide side surfaces, two narrow side surfaces, a bottom surface, and an opening. In the illustrated embodiment, the case 150 and the cap plate 160 coupled to each other are exemplified, so that the opening is not illustrated. The opening corresponds to a substantially opened edge portion of the cap plate 160. The case 150 may accommodate the electrode assembly 110 and the electrolyte in the receiving space. The first and second electrode uncoated portions 111a and 112a of the electrode assembly 110 may be positioned toward the two narrow side surfaces, respectively. The case 150 may be made of at least one selected from the group of aluminum, copper, iron, SUS, ceramic, polymer and equivalents thereof, as examples. The case 150 may be electrically connected to one of the first electrode plate 111 or the second electrode plate 112 of the electrode assembly 110. The case 150 may have the polarity of one of the positive and negative electrodes.

The cap plate 160 may be formed on the case 150 to cover the opening of the case 150. The cap plate 160 may seal the case 150 to prevent the electrolyte accommodated in the case 150 from leaking out. The cap plate 160, including a terminal hole, may allow the electrode terminal 140 to protrude from the upper portion of the cap plate 160. The cap plate 160 may include an injection hole formed at one region to inject an electrolyte, and an injection plug 161 plugging the injection hole once the electrolyte is injected. In addition, the cap plate 160 may include a safety vent 162 that is substantially centrally positioned. The safety vent 162 may be opened earlier than other parts of the cap plate 160 to release gases when the gases are generated within the case 150 due to, e.g., overcharge, which may cause the internal pressure of the case 150 to exceed a predetermined reference pressure, thereby lowering a risk of explosion due to an increase in the internal pressure of the case 150.

An insulation member 170 may be formed on bottom and top surfaces of the cap plate 160 and a region corresponding to the terminal hole. The insulation member 170 may be formed on peripheral regions of the electrode terminal 140 to electrically insulate the cap plate 160 and the electrode terminal 140 from each other. The insulation member 170 may extend to the bottom and top surfaces of the cap plate 160 from the peripheral regions of the electrode terminal 140 to insulate the current collector 120 coupled to the electrode terminal 140 and the nut 180 from the cap plate 160. In some implementations, the insulation member 170 may be formed to insulate only one of the first and second electrode terminals 140 from the cap plate 160. For example, the insulation member 170 may not be formed on the peripheral regions of the second electrode terminal, such that the second electrode terminal and the cap plate 160 may come into direct contact with each other. In such an implementation, the cap plate 160 or the case 150 may have the same polarity as the second electrode terminal.

The nut 180 may be coupled to the electrode terminal 140 from the upper portion of the electrode terminal 140. The nut 180 may engage the screw thread of the electrode terminal 140 through a screw thread formed therein. The nut 180 may be fastened to the electrode terminal 140 to fix the electrode terminal 140 to the cap plate 160. A position of the electrode assembly 110 coupled to the cap plate 160 through the electrode terminal 140 and the current collector 120 may be fixed within the case 150.

As described above, in the secondary battery 100 according to an embodiment, the retainer part 130 may be formed to extend from the current collector 120 to the inner wall of the case 150. The retainer part 130 may be formed to extend from the first surface 123' of the collecting part 123 toward the inner wall of the case 150. The retainer part 130 may be formed to have a width corresponding to a gap G between each of the electrode uncoated portions 111a and 112a and the case 150. The position of the electrode assembly 110 may be fixed within the case 150. Accordingly, the durability of the electrode assembly 110 against vibration may be improved. In addition, the first and second electrode uncoated portions 111a and 112a and the case 150 or the current collector 120 and the case 150 may be maintained in an electrically insulated state.

Further, a protrusion 123a may be formed on the first surface 123' of the collecting part 123, and the retainer part 130 may be molded to surround the first surface 123' and the entire outer surface of the protrusion 123a. The collecting part 123 and the retainer part 130 may be more firmly coupled to each other by the protrusion 123a. The retainer part 130 may be integrally formed with the current collector 120 by molding, and automatic production may be enabled, thereby increasing productivity. Further, the retainer part 130 having a relatively small width may be formed in the current collector 120. Accordingly, space-saving and weight-reducing effects may be obtained. The capacity of the secondary battery 100 may be increased by increasing the width of the electrode assembly 110. In other implementations, the secondary battery 100 can be miniaturized by reducing the width of the case 150 while maintaining the width of the electrode assembly 110.

Hereinafter, a configuration of a secondary battery according to another embodiment will be described.

Figure 8:
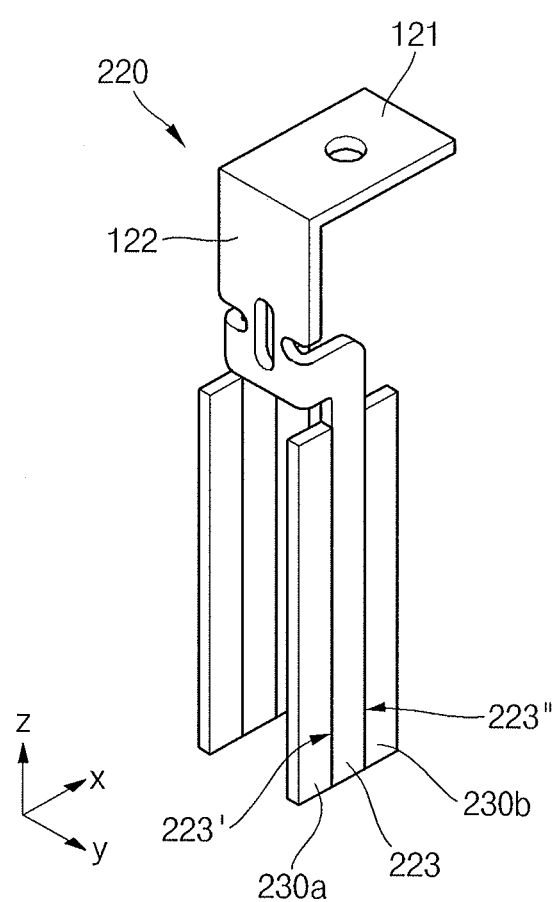
FIG. 8 illustrates a perspective view depicting a current collector according to another embodiment.

FIG. 8 illustrates a perspective view depicting a current collector of a secondary battery according to another embodiment. The secondary battery according to this embodiment may be substantially the same as the secondary battery according to the previous embodiment, except for structure the current collector. Explanations of the substantially same structures will not be repeated. The same components and functions as those of the previous embodiment are denoted by the same reference numerals, and the following description will focus on differences between the present and previous embodiments.

Referring to FIG. 8, the current collector 220 may include a plate part 121, a body part 122, collecting parts 223, and first and second retainer parts 230a and 230b.

The collecting parts 223 may be provided as pairs to make contact with front and second surfaces of an electrode uncoated portion. In addition, each of the collecting parts 223 may include a first surface 223' facing an inner wall of a case (not shown) and a second surface 223" facing an opposite direction from the first surface 223' and parallel thereto. First and second retainer parts 230a and 230b made of an insulating material may be integrally formed with the first and second surfaces 223' and 223" by molding. The first and second retainer parts 230a and 230b may also be provided as pairs.

The first retainer part 230a may extend from the first surface 223' of the collecting part 223 toward the case (in the x-axis direction) so as to contact the inner wall of the case. The first retainer part 230a may be formed to have a width corresponding to the gap G that is a space between the first surface 223' of the collecting part 123 and the case, or, for example, between an end of an electrode uncoated portion and the inner wall of the case. The first retainer part 230a may be formed to have a width equal to the gap G and may have one end connected to the collecting part 223 and the other end making contact with the inner wall of the case. Therefore, a position of an electrode assembly may be fixed within the case by the pair of first retainer parts 230a. Consequently, the first retainer parts 230a may prevent the electrode assembly from moving within the case, thereby improving the durability of the electrode assembly against vibration. In addition, the electrode uncoated portion and the case or the current collector 220 and the case may be maintained in an electrically insulated state.

The second retainer part 230b may extend from the second surface 223" of the collecting part 223 in a direction away from the collecting part 223.

The second retainer part 230b may be formed so as not to pass beyond a boundary region of the electrode uncoated portion and a coated portion (see FIG. 2). The coated portion having an active material layer may be thicker than the electrode uncoated portion in the electrode assembly. Accordingly, the second retainer part 230b may be formed so as not to cover the coated portion. For example, the second retainer part 230b may be formed to be spaced apart from the coated portion. The second retainer part 230b may be formed on the second surface 223" of the collecting part 223. Accordingly, the second retainer part 230b may prevent the electrode uncoated portion from being damaged when the current collector 220 and the electrode uncoated portion are coupled to each other. The coupling of the current collector 220 and the electrode assembly may be achieved by inserting the electrode uncoated portion into a region between the pair of collecting parts 223 such that front and rear surfaces of the electrode uncoated portion are brought into contact with the collecting parts 223. The current collector 220 may be made of an electrically conductive metal. Accordingly, there may be a risk that the electrode assembly could be damaged due to friction. However, the second retainer part 230b may be formed on the second surface 223" of the collecting part 223, and the coupling of the electrode assembly and the current collector 220 may be more facilitated.

As described above, in the secondary battery according to this embodiment, the first and second retainer parts 230a and 230b made of an insulating material are molded to the current collector 220 to then be integrally formed therewith. The first and second retainer parts 230a and 230b may be integrally formed with the first and second surfaces 223' and 223" of the collecting part 223, respectively. The position of the electrode assembly may be fixed within the case, and the durability of the electrode assembly against vibration may be improved. In addition, the coupling of the electrode assembly and the current collector 220 may be facilitated, the electrode uncoated portion may be prevented from being damaged or the likelihood of damage may be substantially reduced.

By way of summation and review, in the secondary battery according to embodiments, a position of an electrode assembly may be fixed in a case by forming a retainer part at an end of a current collector to allow the retainer part to be interposed between the case and the current collector, to improve the durability of the electrode assembly against vibration, and to maintain the case and the current collector or the case and an electrode uncoated portion electrical insulation at an electrically insulated state.

In addition, in the secondary battery according to embodiments, a protrusion may be formed on the first surface of the current collector having the retainer part, thereby tightly coupling the retainer part to the current collector.

Further, in the secondary battery according to embodiments, the retainer part may be molded to the current collector to be integrally formed therewith. Accordingly, automatic production may be enabled, thereby increasing mass productivity.

In addition, in the secondary battery according to embodiments, the retainer part may be formed to have a relatively small width. Accordingly, space-saving and weight-reducing effects may be achieved Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope thereof as set forth in the following claims.

What is claimed is:

1. A secondary battery, comprising:
   an electrode assembly having an electrode uncoated portion;
   a current collector having a body part extending vertically and a pair of collecting parts extending vertically from a bottom portion of the body part and coupled to the electrode uncoated portion;
   a case accommodating the electrode assembly; and
   a cap plate sealing an opening of the case,
   wherein:

each of the collecting parts includes a first surface facing an inner wall of the case and a pair of side surfaces perpendicular to the first surface, a molded retainer part extends toward the inner wall of the case from the first surface of each of the collecting parts, the pair of collecting parts face each other, the retainer part surrounds the first surface of the collecting parts, the retainer part having a pair of side surfaces parallel to each of the side surfaces of the collecting parts, each of the side surfaces of the retainer part and each of the side surfaces of the collecting parts are located on a same plane, and the retainer part is moldingly integrated with each of the collecting parts such that the retainer part does not extend above a top portion of the collecting parts and does not contact the side surfaces of each of the collecting parts.

2. The secondary battery as claimed in claim 1, wherein the retainer part has a shape of a planar plate.

3. The secondary battery as claimed in claim 1, wherein the retainer part is in a space between the first surface of the collecting part and the inner wall of the case.

4. The secondary battery as claimed in claim 1, wherein the retainer part has a width corresponding to the space between the first surface of the collecting part and the inner wall of the case.

5. The secondary battery as claimed in claim 1, wherein:
one end of the retainer part is connected to the first surface of the collecting part, and
an other end of the retainer part contacts the inner wall of the case.

6. The secondary battery as claimed in claim 1, wherein an additional retainer part is further formed on a second surface on an opposite side of the collecting part from the first surface, the additional retainer part extending from the second surface in a direction away from the collecting part.

7. The secondary battery as claimed in claim 6, wherein the additional retainer part is moldingly integrated with the collecting part.

8. The secondary battery as claimed in claim 1, wherein the retainer part includes at least one material selected from the group of a polyethylene (PE) resin, a polypropylene (PP) resin, a polystyrene (PS) resin, and an acrylonitrile butadiene styrene (ABS) resin.

9. The secondary battery as claimed in claim 1, wherein the first surface of the collecting part includes a protrusion protruding toward the inner wall of the case.

10. The secondary battery as claimed in claim 9, wherein the first surface of the collecting part has a larger area than a cross section of the protrusion parallel to the first surface.

11. The secondary battery as claimed in claim 9, wherein the protrusion has a shape, in a cross-section perpendicular to the first surface, selected from a circle, a semi-circle, and a polygon.

12. The secondary battery as claimed in claim 9, wherein the retainer part covers an outer surface of the protrusion.

13. The secondary battery as claimed in claim 9, wherein the retainer part surrounds an entire outer surface of the protrusion.

14. The secondary battery as claimed in claim 1, including a protrusion located between the retainer and the first surface.

15. The secondary battery as claimed in claim 1, wherein the retainer part includes a resin material.

16. The secondary battery as claimed in claim 1, wherein the retainer part includes an electrically insulating material.

17. The secondary battery as claimed in claim 1, wherein each of the collecting parts includes a single protrusion which protrudes from the first surface towards the inner wall of the case.

18. The secondary battery as claimed in claim 17, wherein the first surface is elongated along a direction of the inner wall and the protrusion extends along the first surface and is elongated along the direction of the inner wall.

* * * * *